United States Patent [19]

Yoshinada et al.

[11] Patent Number: 5,018,922
[45] Date of Patent: May 28, 1991

[54] MASTER/SLAVE TYPE MANIPULATOR

[75] Inventors: Hiroshi Yoshinada, Machida; Shu Takeda, Hiratsuka, both of Japan

[73] Assignee: Kabushiki Kaisha Komatsu Seisakusho, Tokyo, Japan

[21] Appl. No.: 406,073

[22] Filed: Sep. 12, 1989

Related U.S. Application Data

[62] Division of Ser. No. 30,887, Mar. 26, 1987, Pat. No. 4,893,981.

[51] Int. Cl.$^5$ .............................................. B25J 3/04
[52] U.S. Cl. ........................................... 414/5; 901/8
[58] Field of Search .................. 414/5, 909; 901/8, 9; 244/234, 236, 237

[56] References Cited

U.S. PATENT DOCUMENTS

| | | | |
|---|---|---|---|
| 3,263,824 | 8/1966 | Jones et al. | 414/5 |
| 4,531,082 | 7/1985 | Yoshinada et al. | 180/142 X |
| 4,661,032 | 4/1987 | Arai | 414/5 |
| 4,807,153 | 2/1989 | Onaga et al. | 901/9 X |
| 4,888,538 | 12/1989 | Dimitrou et al. | 901/9 X |

FOREIGN PATENT DOCUMENTS

| | | | |
|---|---|---|---|
| 0582960 | 12/1977 | U.S.S.R. | 901/9 |
| 0614939 | 6/1978 | U.S.S.R. | 901/9 |
| 0729545 | 4/1980 | U.S.S.R. | 901/9 |
| 0748342 | 7/1980 | U.S.S.R. | 901/9 |
| 0830292 | 5/1981 | U.S.S.R. | 901/9 |
| 1403016 | 6/1988 | U.S.S.R. | 901/9 |

OTHER PUBLICATIONS

Raibert, M. H. et al., "Hybrid Position/Force Control of Manipulators"; *Journal of Dynamic Systems, Measurement, and Control*, 6/1981.

Primary Examiner—Robert J. Spar
Assistant Examiner—William M. Hienz
Attorney, Agent, or Firm—Spensley Horn Jubas & Lubitz

[57] ABSTRACT

A force feeling type master/slave manipulator detects a positional difference, a speed difference, and a force difference between the master and slave machines. The position difference and force difference are combined in a weighted manner and the output is used to drive an actuator on the control lever of the master machine to provide a force feeling feedback effect. The position difference is also combined in a weighted manner with the speed difference and the speed of the working machine to provide a sum value. The load force is subtracted from the sum value and the result is used to provide a signal for driving the actuator of the working machine. As a result, stable operation of the control lever is provided, natural vibration of the working machine is reduced and the working machine is stabilized against large inertial loads.

4 Claims, 8 Drawing Sheets

MASTER/SLAVE TYPE MANIPULATOR

This is a division of application Ser. No. 07/030,887, filed on Mar. 26, 1987, now U.S. Pat. No. 4,893,981.

BACKGROUND OF THE INVENTION

1. Field of the Invention

The present invention relates to a master/slave type manipulator in which a working machine is used as a slave and a control lever similar to the working machine is used as a master.

2. Description of the Prior Art

In a prior art manipulator of the type referred to, when a large driving force is necessary for a working machine of a slave, such a hydraulic actuator as a hydraulic motor or a hydraulic cylinder is provided. Further, a flow control servo valve is usually provided to control the hydraulic actuator. The flow control servo valve is controlled so that a positional deviation of the working machine to a master control lever becomes zero, i.e., so that the slave working machine follows up the master control lever.

Meanwhile, there is a so-called force feeling type of manipulator in which such an external force as the weight of a load carried by a working machine is transmitted to the operator through a control lever. An example of such manipulators of a force feedback, load force feeling, single joint type is schematically shown in FIG. 9 wherein a working machine 1 is driven by a hydraulic cylinder 2. That is, the working machine 1 is driven by the hydraulic cylinder 2 which receives from a flow control servo valve 3 oil corresponding in quantity to a positional difference ($\theta$m$-\theta$s) between a control lever 4 and the working machine 1. In this case, a pressure applied to the hydraulic cylinder 2 is detected by a pressure sensor 5 and amplified by a driving amplifier 7 to drive a torque motor 6 provided in a joint part of the control lever 4 in accordance with the value of the detected pressure. More specifically, the pressure sensor 5 is provided to detect a difference in pressure between a pair of oil paths provided between the servo valve 3 and hydraulic cylinder 2, the differential pressure corresponding to a load force applied to the working machine 1. Therefore, a driving force according to an external force applied to the working machine 1 is applied to the control lever 4 in a direction opposite to the lever manipulating direction. As a result, the operator can feel through the control lever 4, the external force applied to the working machine 1 in the form of the magnitude of an operating force of the control lever 4. The opening of the flow control servo valve 3 is adjusted in accordance with the positional difference signal ($\theta$m$-\theta$s) corresponding to a subtraction of an output signal $\theta$s of a position sensor 9 provided in a joint part of the working machine 1 from an output signal $\theta$m of a position sensor 8 provided in the joint part of the control lever 4 by means of a subtracter 10. Thus, in this type of manipulator, the operator feels the load force fed back directly to the control lever.

This manipulator is excellent in load-force feeling performance and impulsive-force transmission, since the load force is transmitted to the control lever through a force servo system independent of a position servo system. In addition, the force servo system functions to make zero the force acting on the control lever during non-load operation of the working machine and thus the viscosity resistance and frictional resistance of the control lever have no effect on the operating force of the control lever.

There is also proposed a manipulator of a symmetrical, load-force feeling type wherein a driving signal based on a positional difference between a master control lever and a slave working machine is applied to such a torque actuator as mentioned above. Since the positional difference is proportional to a load force acting on the working machine, the operator can feel the load force through the control lever. This manipulator requires no special load-force detector and has a simple and reliable arrangement. Further, a position servo system acts on the control lever and thus the manipulator can be stably operated without causing any positional deviation between the control lever and working machine even when the working machine causes the control lever to be driven in the opposite direction.

In such force feeling types of manipulators as mentioned above, the external force applied to the hydraulic cylinder 2 includes not only a load W but also the weight of the working machine 1 itself, so that the operator feels the operating force of the control lever 4 more heavily by an amount corresponding to the machine's own weight. This problem can be eliminated by adjusting the gain of the driving amplifier 7 so as to set a relationship of the load W to the operating force of the control lever 4 to be 1 to 1.

However, when it is desired to pull the load W up or move the load to a different position, such manipulators have had such a problem that a force corresponding to the moving speed of the working machine 1 is generated and the operator feels the operating force of the control lever 4 more heavily by an amount corresponding to this force, which results in that the operator feels his manipulator control differently from the time of such a work not involving a large load movement as a grinder work and thus feels difficult in the control. This problem takes place even when the manipulator is in its no-load state due to the weight of the working machine 1 itself.

Further, the manipulator of the force feedback, load force feeling type as mentioned above is defective in that when the working machine causes the control lever to be reversely driven, the operation tends to become easily instable because of no provision of the position servo system to the control lever.

The manipulator of the symmetrical, load-force feeling type, on the other hand, is defective in that the operator feels poorly an impulsive force acting on the working machine, since the load force is once converted to a positional difference and then transmitted to the control lever. In addition, this manipulator has also such a problem that the viscosity resistance and frictional resistance of the control lever have a direct effect on the lever operating force and thus some compensation usually becomes necessary to obtain a good load feeling performance, but the complete elimination of the viscosity resistance component involves the unstable operation of the control lever, thereby deteriorating a high stability inherent to the symmetrical type.

The present invention is directed to provision of a force feeling type manipulator which can suppress the defects in the above prior art manipulators, with a high stability and a high load feeling ability.

SUMMARY OF THE INVENTION

In accordance with the present invention, an output signal of a pressure sensor for detecting a pressure in a hydraulic cylinder is divided by any one of the shifting speed of a slave working machine, manipulating or operating speed of a master control lever, displacement in a spool of a flow control servo valve, speed difference between the master control lever and slave working machine and positional difference between the master control lever and slave working machine. The divided value signal is used to drive a torque actuator provided in a joint part of the control lever. Therefore, as the above respective parameters including the shifting speed of the working machine are increased, the output of the pressure sensor is changed to a smaller value through the divisional operation. This also causes the reduction of a reverse torque applied from a torque motor to the control lever, thus lightening the lever operating force. That is, since the operator feels the reverse torque applied to the control lever in accordance with the moving speed of a load, he can conduct the load moving work with substantially the same manipulating feeling as a grinder work and with an improved controllability.

In accordance with the present invention, there is provided a force feeling type manipulator which has a means for detecting a positional difference between the master and slave and in which an actuator provided on the slave side is actuated so that the slave follows up the master on the basis of the above positional difference, said manipulator being characterized by comprising a means for detecting a force acting on the slave and a means for applying a driving signal corresponding to a sum of outputs of the positional-difference detecting means and force detecting means to the torque actuator provided on the master side.

The force feeling type manipulator according to the present invention can exhibit a high stability and a good manipulation characteristics with an excellent load-force feeling performance, since the manipulator of the present invention suppresses the demerits in both the symmetrical and force-feedback type manipulators and also maintains the merits in the both types.

DESCRIPTION OF THE PREFERRED EMBODIMENTS

Figure 1:
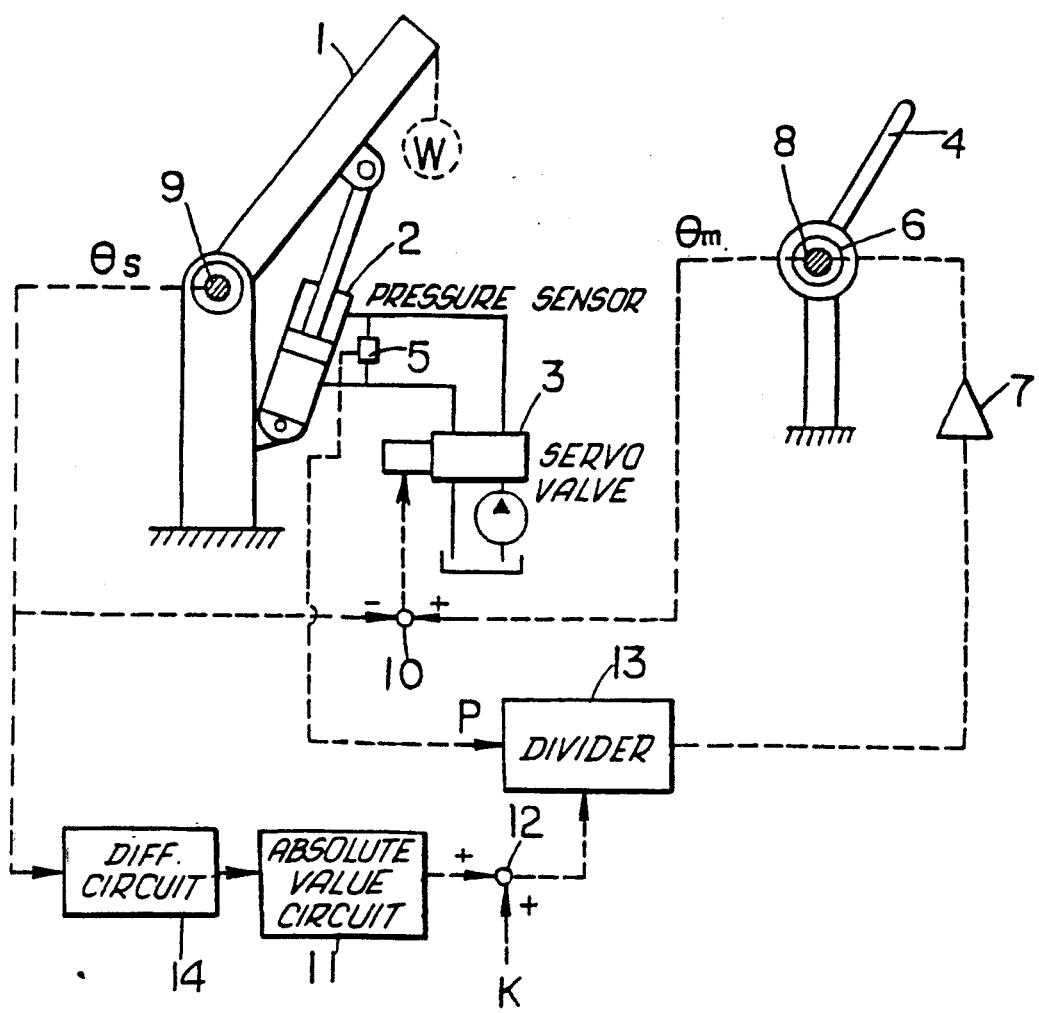
FIG. 1 is a block diagram showing a first embodiment of the present invention.
Figure 2:
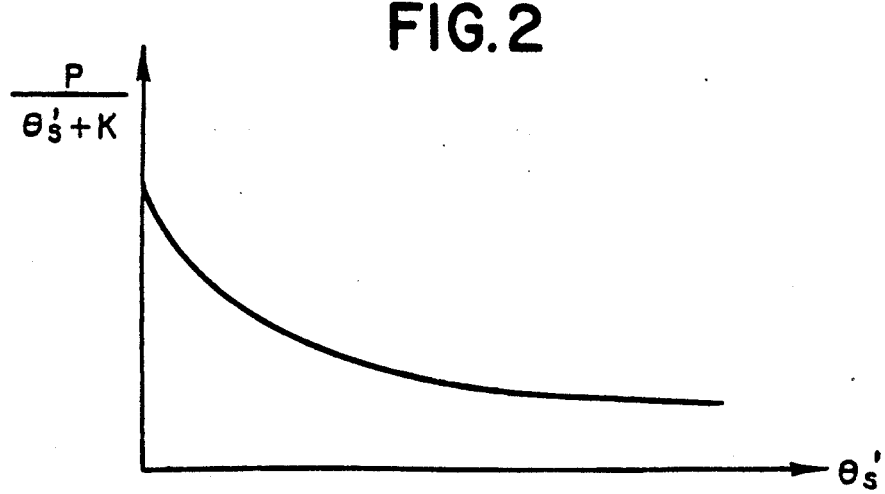
FIG. 2 is a graph showing a relationship between the speed of a working machine and the input of a driving amplifier.

Referring first to FIG. 1, a working machine 1 as a slave is driven by a hydraulic cylinder 2 forming a working machine actuator and the hydraulic cylinder 2 is controlled by a flow control servo valve 3. The opening of the servo valve 3 is adjusted by a positional difference signal ($\theta m - \theta s$) corresponding to a subtraction of an output signal $\theta s$ of a position sensor 9 (which comprises a potentiometer or the like) provided in a joint part of the working machine 1 (as the slave) from an output signal $\theta m$ of a position sensor 8 (which comprises a potentiometer or the like) provided in a joint part of a control lever 4 by means of a subtracter 10, to control the rate of oil to be supplied to the hydraulic cylinder 2. In the present embodiment, a detection output of a pressure sensor 5 is corrected on the basis of a shifting speed $\theta s'$ of the working machine 1 to drive a torque motor 6 (as a torque actuator) provided in the joint part of the control lever 4. The shifting speed $\theta s'$ is obtained by differentiating the detected position signal $\theta s$ of the position sensor 9 through a differentiating circuit 14 and then by passing the differentiated output through an absolute value circuit 11. In this way, the shifting speed $\theta s'$ of the working machine 1 is obtained in the form of an absolute value. The shifting speed $\theta s'$ as an absolute value is sent to an adder 12 to be added to an offset value K that is also applied to the adder 12. The added value signal is then applied to a divider 13 as a denominator input. The divider 13, which also receives an output signal P of the pressure sensor 5 as a numerator input, supplies its divided result signal ($P/(\theta s' + K)$) to a driving amplifier 7 to be used as a driving signal of the torque motor 6. Accordingly, as the shifting speed $\theta s'$ of the working machine 1 is increased, the value of the divided value signal ($P/(\theta s' + K)$) is decreased as shown by a graph in FIG. 2. This causes the reduction of a reverse torque applied from the torque motor 6 to the control lever 4, so that the user can operate the control lever 4 while not affected by the shifting speed $\theta s'$. The offset value K, which is set to be usually 1 when $\theta s' - 0$, is provided to avoid such situation that the divided values becomes infinite when the denominator input of the divider 13 becomes zero.

Figure 3:
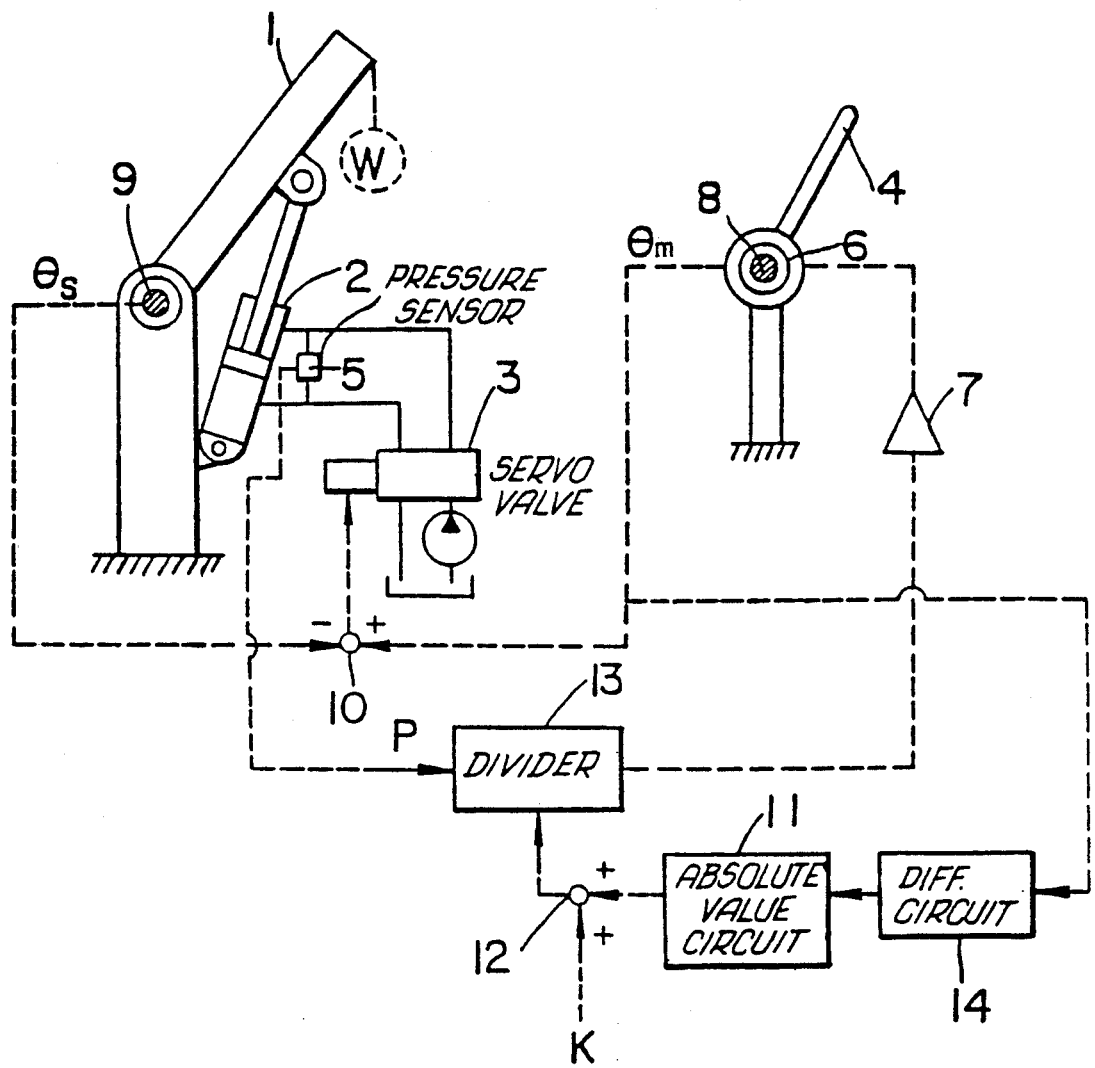
FIGS. 3 to 8 are block diagrams showing second to seventh embodiments of the present invention respectively.

There is shown a block diagram of a second embodiment of the present invention in FIG. 3 wherein an output signal of the pressure sensor 5 is corrected on the basis of a shifting speed $\theta m'$ of the control lever 4 to drive the torque motor 6. In the present embodiment, the shifting speed $\theta m'$ is obtained by differentiating the detected position signal $\theta m$ of the position sensor 8 through the differentiating circuit 14 and then by passing the differentiated output through the absolute value circuit 11. In this way, the shifting speed $\theta m'$ of the control lever 4 is obtained in the form of an absolute value. The shifting speed $\theta m'$ as an absolute value is sent to the adder 12 to be added to the offset value K that is also applied to the adder 12. The added value signal is then applied to the divider 13 as a denominator input. The divider 13, which also receives the output signal P of the pressure sensor 5 as a numerator input, supplies its divided result signal ($P/(\theta m' + K)$) to the driving amplifier 7 to be used as a driving signal of the torque motor 6. Accordingly, as the shifting speed $\theta m'$ of the control lever 4 is increased, the value of the divided value signal ($P/(\theta m' + K)$) is decreased as in the embodiment of FIG. 1. This causes the reduction of the reverse torque applied from the torque motor 6 to the control lever 4, which results in that the operator can operate the control lever 4 while not affected by the shifting speed $\theta m'$.

Figure 4:
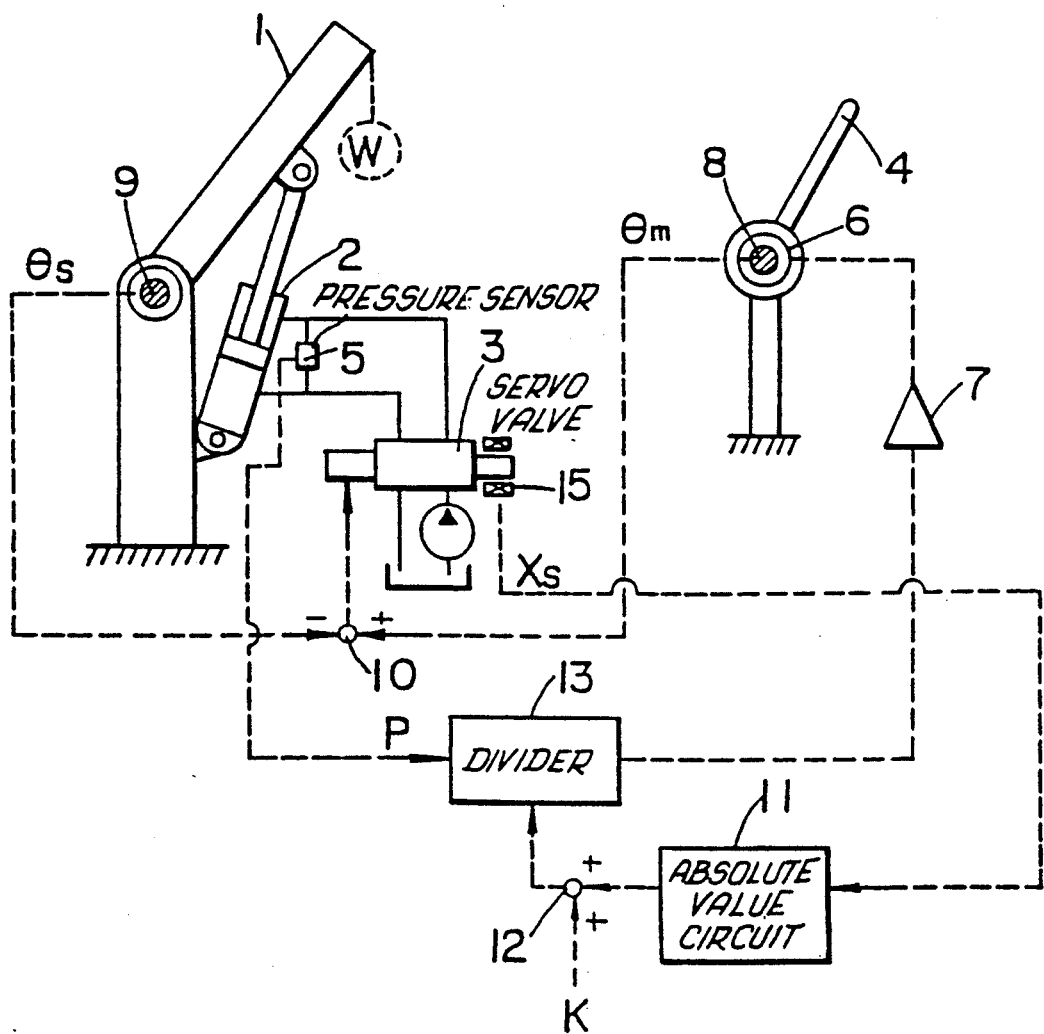

Shown in FIG. 4 is a block diagram of a third embodiment of the present invention in which a displacement Xs in a spool of the flow control servo valve 3 is detected and the output signal P of the pressure sensor 5 is corrected on the basis of the detected displacement output to drive the torque motor 6. In the present embodiment, the spool displacement Xs of the servo valve 3 is detected by a displacement meter 15 and further applied to the absolute value circuit 11. A spool displacement output Xs' of the absolute value circuit 11 is applied to the adder 12 to be added to the offset value K that is also applied to the adder 12. The added value signal is then applied to the divider 13 as a denominator input. The divider 13, which also receives the output signal P of the pressure sensor 5 as a numerator input, supplies its divided result signal (P/(Xs'+K)) to the driving amplifier 7 to be used as a driving signal of the torque motor 6. Accordingly, as the spool displacement Xs' of the servo valve 3 is increased, the value of the divided value signal (P/(Xs+K)) is decreased as in the embodiment of FIG. 1, thus producing substantially the same effect as in the foregoing embodiments.

Figure 5:
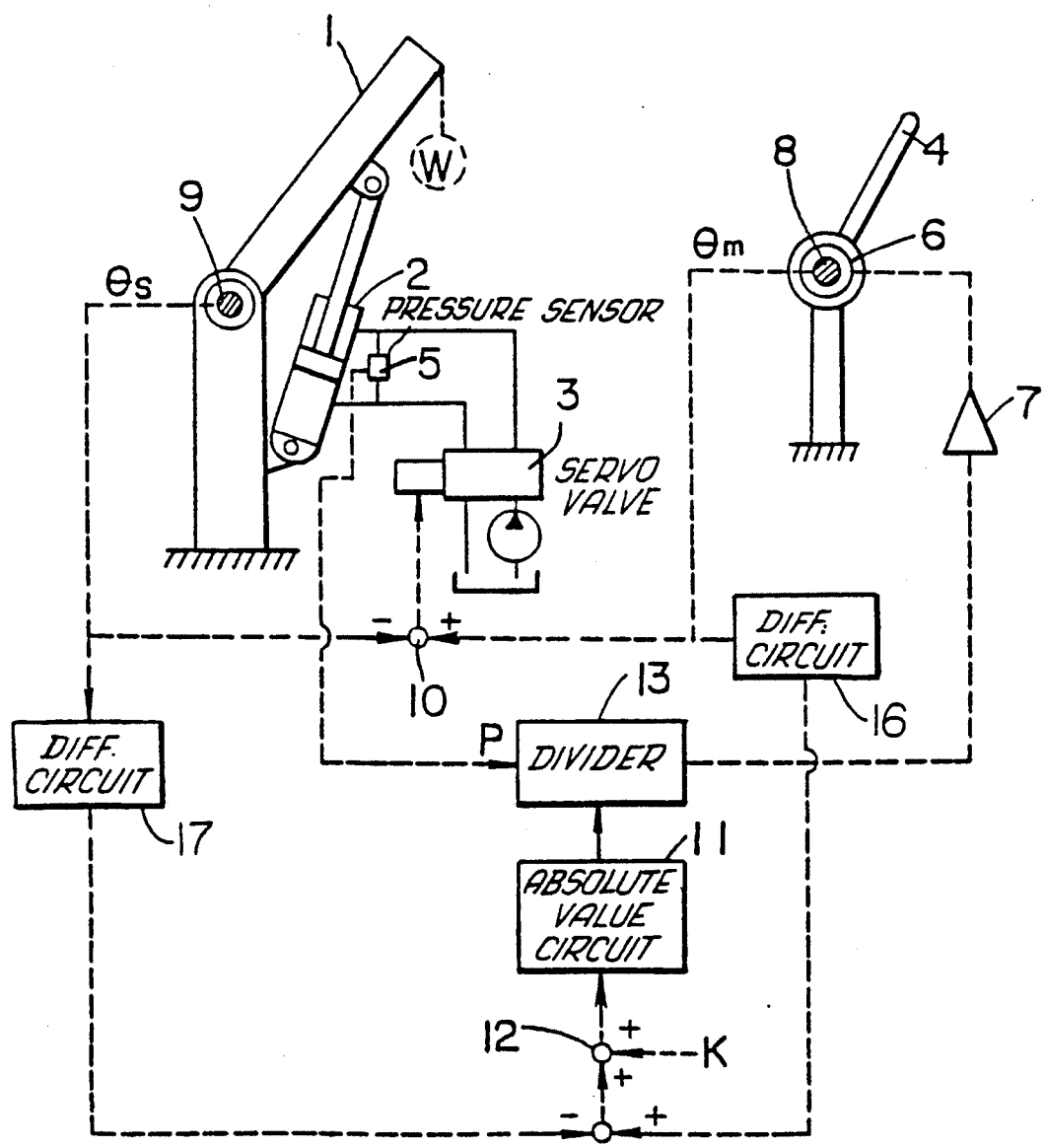
Figure 6:
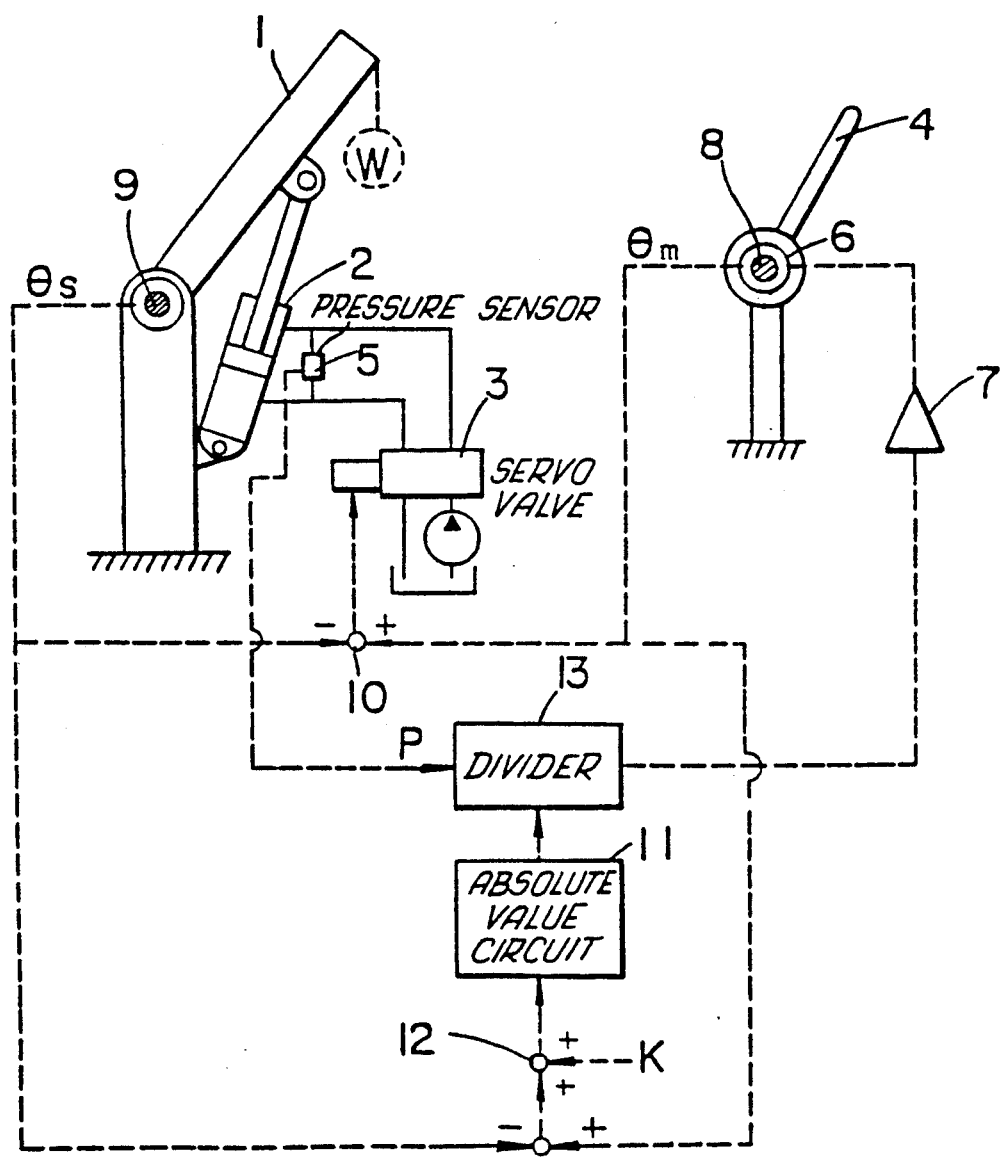

Referring to FIG. 5, there is shown a block diagram of a fourth embodiment of the present invention in which the output signal $\theta$m of the position sensor 8 is applied to a differentiating circuit 16 to find the shifting speed $\theta$m' of the control lever 4, the output signal $\theta$s of the position sensor 9 is applied to a differentiating circuit 17 to find the shifting speed $\theta$s' of the working machine 1, an absolute value of a difference ($\theta$m'−$\theta$s') between these two shifting speeds $\theta$m' and $\theta$s' is found by the absolute value circuit and then supplied to the adder 12 to be added to the offset value K, and the added signal is supplied to the divider 13 as a denominator input of the divider. Accordingly as the difference between the shifting speeds $\theta$m' and $\theta$s' is increased, the reverse torque applied from the torque motor 6 to the control lever 4 is decreased, thus providing substantially the same effect as in the foregoing embodiments. In this case, the large shifting speed of the working machine 1 is equivalent to the fact that a positional difference ($\theta$m−$\theta$s) between an operating position $\theta$m of the control lever 4 and a shifted position $\theta$s of the working machine 1 with respect to the driving start point of the working machine 1 is large. As a result, as in a fifth embodiment shown in FIG. 6, the absolute value of a difference between the output signals of the position sensor 8 and 9 may be found by the absolute value circuit 11 and then supplied through the adder 12 to the divider 13 as a denominator input of the divider. The embodiment of FIG. 6 can provide substantially the same effect as in the foregoing embodiments.

Figure 7:
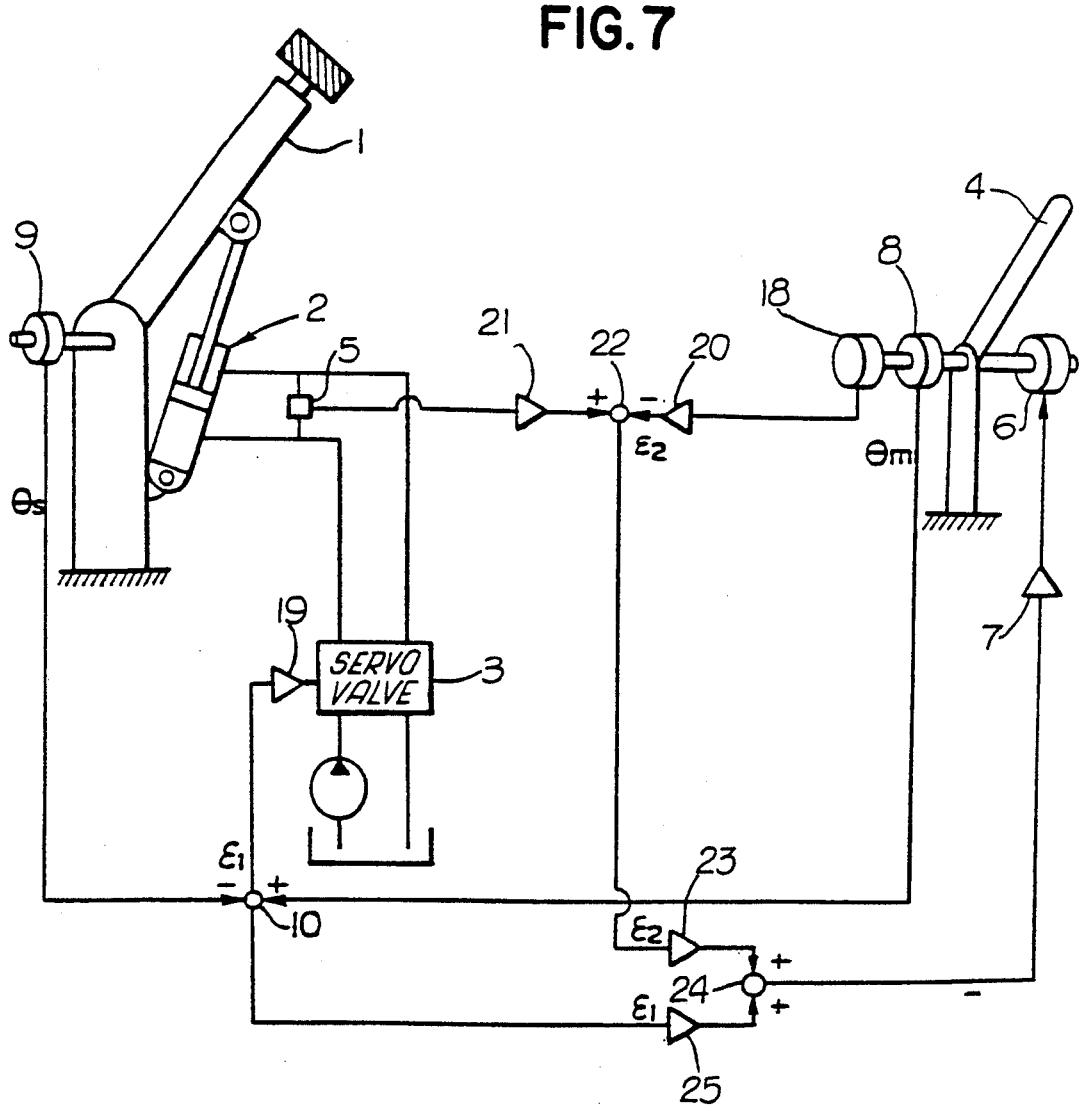

FIG. 7 shows a sixth embodiment of the present invention. In the present embodiment, there are mounted on a rotary shaft part of the master control lever 4 such a position sensor 8 detecting the rotational position $\theta$m of the shaft as a potentiometer, the torque motor 6 applying a torque to the rotary shaft and a force sensor 18 (such as a magnetic torque sensor or a torsional torque sensor) detecting a rotational force of the rotary shaft.

Both outputs of the position sensors 8 and 9 are applied to the subtracter 10 where a difference between the both outputs, i.e., a positional deviation $\epsilon_1 = \theta m - \theta s$ of the working machine 1 with respect to the lever 4 is calculated. The calculated positional deviation output $\epsilon_1$ of the subtracter 10 is supplied through a servo amplifier 19 to the servo valve 3 and also supplied to an amplifier 25 for weighting and then to an adder 24. On the other hand, both outputs of the force and pressure sensors 18 and 5 is applied through amplifiers 20 and 21 to subtracter 22 where a difference between the both outputs of the amplifiers 20 and 21, i.e., a force difference $\epsilon_2$ between the control lever 4 and working machine 1 is calculated. The calculated signal indicative of the force difference is suitably weighted by an amplifier 23 and then applied to the adder 24. An output of the adder 24 is applied through the driving amplifier 7 to the torque motor 6.

In the manipulator according to the foregoing embodiment, a driving force of a position servo system based on the difference $\epsilon_1$ and a driving force of a force servo system based on the difference $\epsilon_2$ act on the torque motor 6 provided to the control lever 4. That is, when the control lever 4 is operated, the hydraulic cylinder 2 is actuated in such a direction as decreases the positional difference $\epsilon_1$ so that the working machine 1 is shifted to follow up the control lever 4. At this time, since the driving signal based on the positional difference $\epsilon_1$ is applied through the adder 24 to the torque motor 6, a torque corresponding to a load force acting on the working machine 1 is transmitted to the control lever 4 in a direction opposite to the operating direction of the lever. In more detail, when the load force is small, the difference $\epsilon_1$ becomes small because of the good follow-up performance of the working machine 1, while, when the load force is large, the follow-up performance is reduced and the difference $\epsilon_1$ becomes large, which means that the control lever 4 is subjected to a torque corresponding in magnitude to the load force. In the force servo system, on the other hand, a driving signal based on the difference $\epsilon_2$ between the output of the pressure sensor 5 indicative of the load force of the working machine 1 and the output of the force sensor 18 is applied through the adder 24 to the torque motor 6.

In this way, since the torque motor 6 is applied with the both driving signals based on the difference $\epsilon_1$ and $\epsilon_2$, the operator can feel the load force through the control lever 4. The present embodiment, in which the control lever 4 is provided with the both position and force servo systems, can have advantages of the earlier-mentioned symmetrical, load-force feeling type manipulator combined with advantages of the earlier-mentioned force feedback, load-force feeling type manipulator, thus correcting defects in the both types. More specifically, since the position servo system acts on the control lever, such a disadvantage can be prevented that the control lever 4 is driven reversely by a force transmitted from the working machine side to the control lever side. Further, since the load force is transmitted through the force servo system directly to the side of the control lever 4, the load force feeling performance is good. Therefore, for example, when the working machine 1 is subjected to an impulsive force, the impulse can be quickly and positively transmitted to the control lever side.

Figure 8:
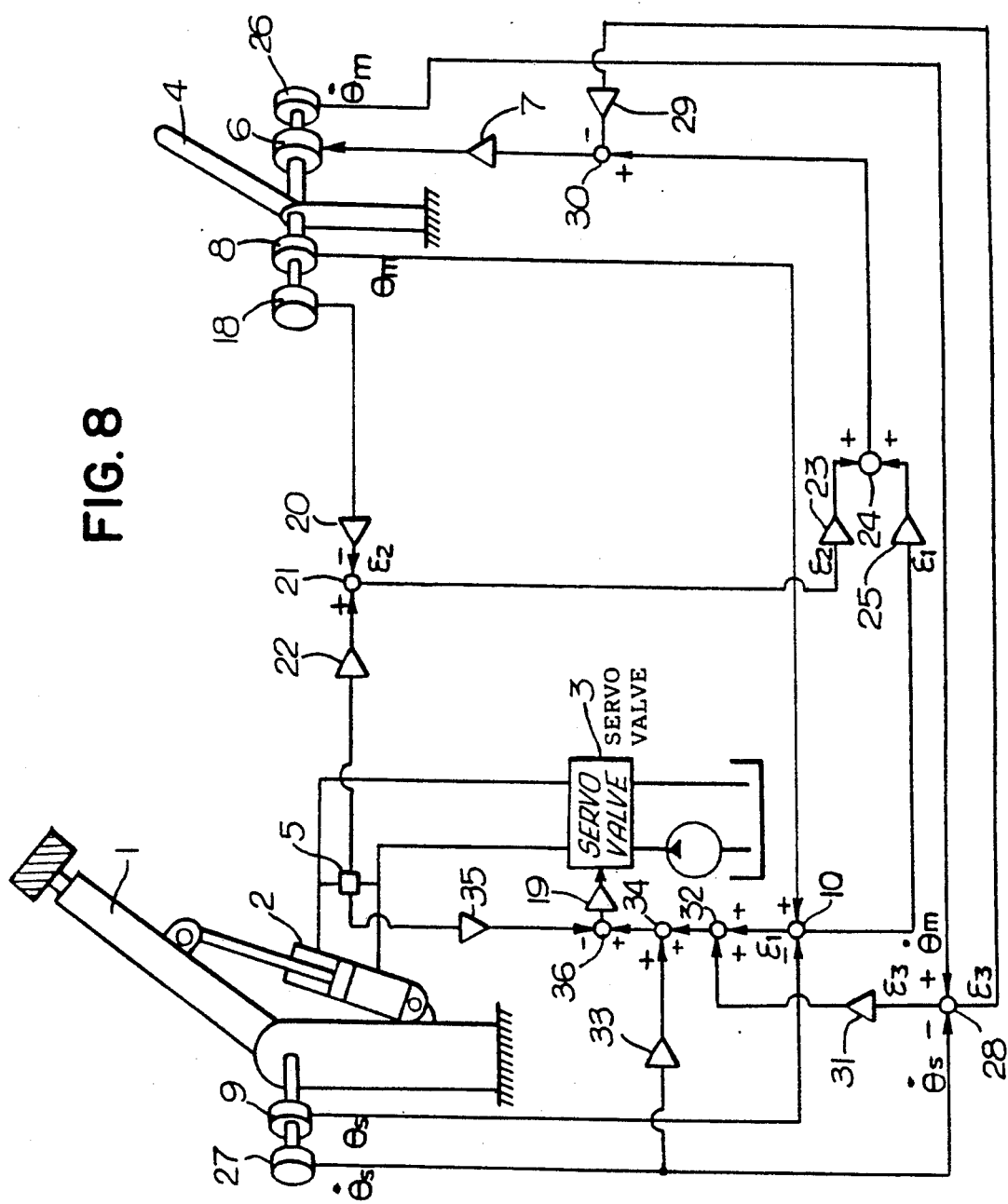
Figure 9:
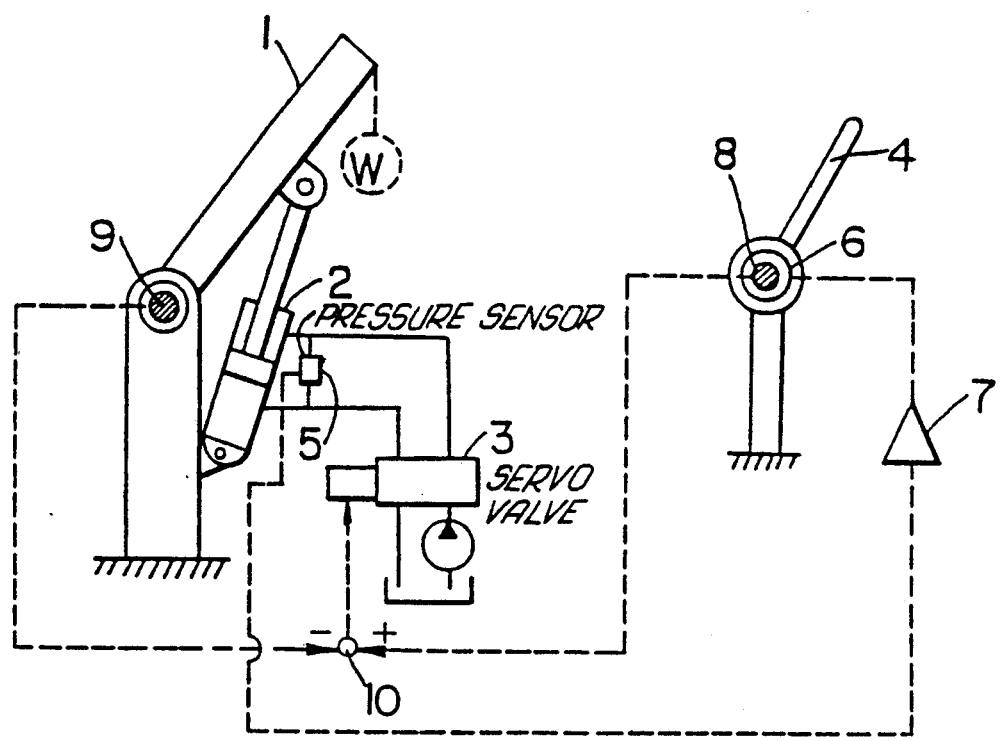
FIG. 9 is a block diagram showing an arrangement of a prior art manipulator.

FIG. 8 shows a seventh embodiment of the present invention which is arranged to realize its operational stabilization. Basic arrangement and function of the present embodiment are substantially the same as those of the sixth embodiment shown in FIG. 7. In the present embodiment, a speed sensor 26 (for example, a tachometer generator) for detecting an operating speed $\dot\theta$m of the control lever 4 is mounted on a shaft of the control lever, while a speed sensor 27 for detecting a rotational speed $\dot\theta$s of the working machine 1 is mounted on a shaft of the working machine. Outputs of the speed sensors 26 and 27 are applied to a subtracter 28 where a speed difference $\epsilon_3 = \dot\theta m - \dot\theta s$ is calculated. The output $\epsilon_3$ of the subtracter 28 is negatively fed back to an output of the adder 24 through an amplifier 29 and a subtracter 30. As a result, according to the present embodiment, sufficient damping can be provided to the control lever 4, whereby the control lever can be stably operated.

The output of the subtracter 28 is also positively fed back to the servo amplifier 19 through an amplifier 31 and an adder 32, whereby the natural vibration of the working machine 1 can be improved. The output of the speed sensor 27 is also positively fed back to the servo amplifier 19 through an amplifier 33 and an adder 34, so that such a disadvantage can be avoided that a force transmission signal based on the difference $\epsilon_1$ is affected by a positional difference (so called, droop) based on the operating speed. Further, the output of the pressure sensor 5 is also negatively fed back to the servo amplifier 19 through an amplifier 35 and a subtracter 36. As a result, sufficient damping can be provided to the working machine 1 having usually a large inertia load, thus realizing its operational stabilization.

Although the manipulators of the single shaft arrangement have been shown in the foregoing embodiments for brevity of explanation, the present invention may of course be applied even to a manipulator of a multi-shaft arrangement.

What is claimed is:

1. A master/slave type manipulator comprising:
   slaver means in the form of a working machine operated by a first actuator;
   master means in the form of a control lever similar to said working machine and having a second actuator providing a torque to said control lever in a direction opposite to an operating direction of the control lever;
   a first position sensor for detecting an actuated position of the working machine;
   a first speed sensor for detecting a shifting speed of the working machine;
   a second position sensor for detecting an operating position of the control lever;
   a second speed sensor for detecting an operating speed of the control lever;
   means for detecting a load acting on the working machine;
   means for detecting a torque applied to the control lever;
   first means for calculating a difference between an output of said first position sensor and an output of said second position sensor;
   second means for calculating a difference between an output of said load detecting means and an output of said torque detecting means;
   third means for calculating a difference between an output of said first speed sensor and an output of said second speed sensor;
   fourth calculating means for weighting respectively and adding together an output of said first calculating means and an output of said second calculating means and for subtracting a weighted value of an output of said third calculating means from said weighted and added values;
   first driving means for driving said second actuator in accordance with said subtracted value of said fourth calculating means;
   fifth calculating means for summing the output of said first calculating means, and a weighted output of said first speed sensor, and for subtracting the output of said load detecting means from said sum; and
   second driving means for driving said first actuator in accordance with an output of said fifth calculating means.

2. A master/slave type manipulator as set forth in claim 1, wherein said first actuator is a hydraulic cylinder, said second driving means is a flow control servo valve, and said load detecting means is a pressure sensor for detecting a pressure difference between a pair of oil lines disposed between said hydraulic cylinder and said flow control servo valve.

3. A master/slave type manipulator as set forth in claim 1, wherein said second actuator is a torque motor.

4. A master/slave type manipulator as set forth in claim 2, wherein said second actuator is a torque motor.

* * * * *